(12) United States Patent
Ebuchi

(10) Patent No.: US 8,995,013 B2
(45) Date of Patent: Mar. 31, 2015

(54) INFORMATION PROCESSING APPARATUS AND CONTROL METHOD FOR CONTROLLING DISPLAY OF A USER INTERFACE SCREEN

(75) Inventor: Kazuhisa Ebuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 533 days.

(21) Appl. No.: 12/949,339

(22) Filed: Nov. 18, 2010

(65) Prior Publication Data
US 2011/0141492 A1 Jun. 16, 2011

(30) Foreign Application Priority Data

Dec. 10, 2009 (JP) ................. 2009-280720

(51) Int. Cl.
G06F 15/00 (2006.01)
G06K 1/00 (2006.01)
H04N 1/60 (2006.01)
G06F 3/12 (2006.01)
G06K 15/02 (2006.01)
H04N 1/387 (2006.01)

(52) U.S. Cl.
CPC .................. H04N 1/3875 (2013.01)
USPC ............ 358/1.9; 358/1.2; 358/1.15; 358/1.18

(58) Field of Classification Search
None
See application file for complete search history.

(56) References Cited

U.S. PATENT DOCUMENTS

| 5,428,459 | A * | 6/1995 | Asai ............................... 358/449 |
| 6,449,398 | B1 * | 9/2002 | Gennetten ..................... 382/298 |
| 6,456,305 | B1 * | 9/2002 | Qureshi et al. ................ 715/800 |
| 6,912,311 | B2 * | 6/2005 | Anderson et al. ............. 382/209 |
| 2001/0014183 | A1 * | 8/2001 | Sansom-Wai et al. ........ 382/289 |
| 2007/0036468 | A1 * | 2/2007 | Matsushita et al. ........... 382/305 |
| 2007/0121141 | A1 * | 5/2007 | Takabayashi et al. ......... 358/1.9 |
| 2008/0095470 | A1 * | 4/2008 | Chao et al. .................... 382/298 |

FOREIGN PATENT DOCUMENTS

| JP | 2003-046763 A | 2/2003 |
| JP | 2004-023544 A | 1/2004 |

\* cited by examiner

*Primary Examiner* — Ming Hon
(74) *Attorney, Agent, or Firm* — Carter, DeLuca, Farrell & Schmidt, LLP

(57) ABSTRACT

A UI driver determines an output region corresponding to an output paper size in a display region of the printer driver UI, and if a length of at least one side of the output region is longer than a corresponding side of an original image, performs cropping of the original image such that a removed portion of a distribution region of a main object in the original image is at the minimum after enlarging the original image, and if a length of each side of the output region is shorter than or equal to a corresponding side of the original image and not longer than a corresponding side of the distribution region of the main object, performs cropping of the original image such that a removed portion of the distribution region of the main object is at the minimum after reducing the original image.

7 Claims, 8 Drawing Sheets

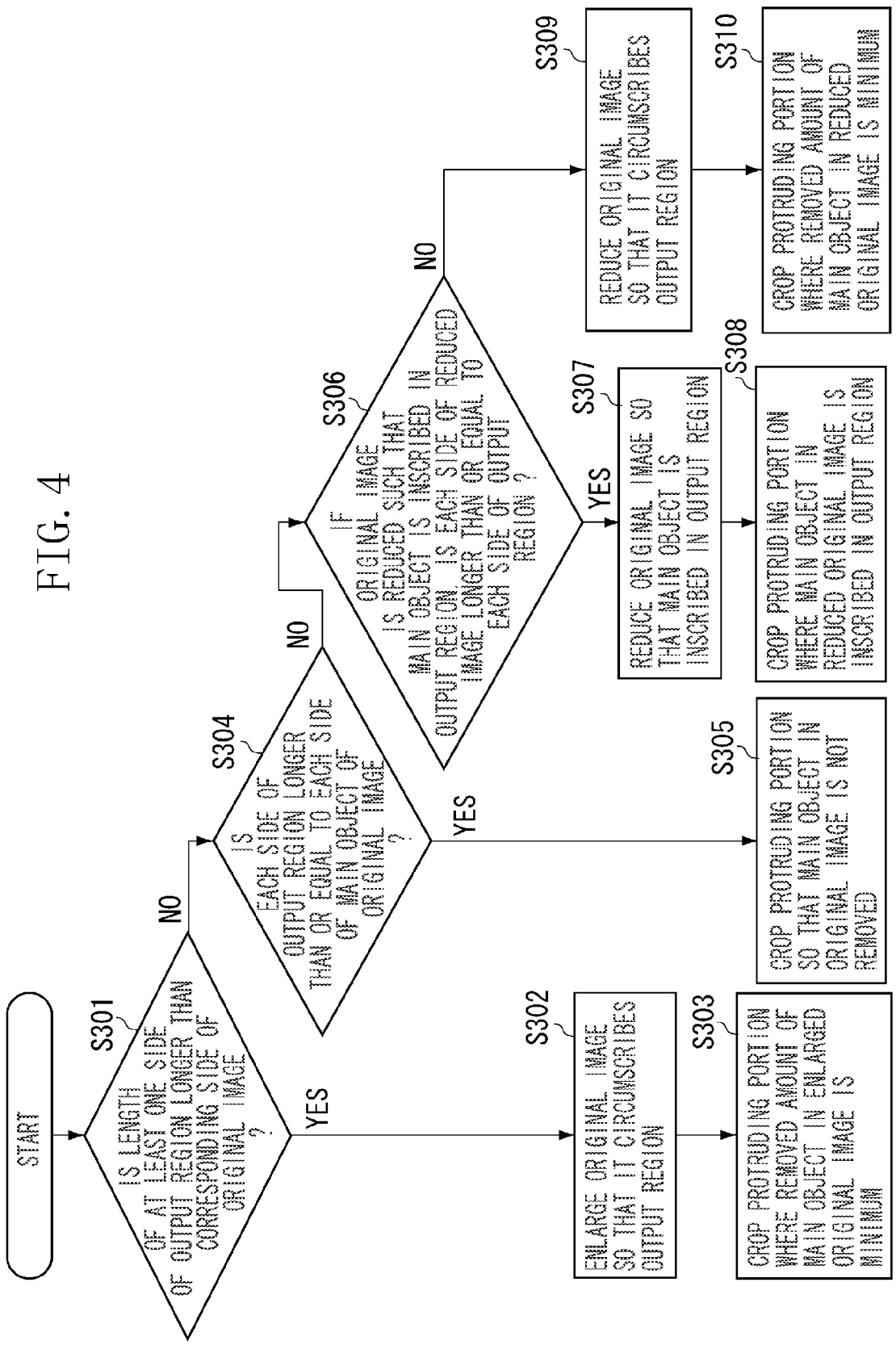

INFORMATION PROCESSING APPARATUS AND CONTROL METHOD FOR CONTROLLING DISPLAY OF A USER INTERFACE SCREEN

BACKGROUND OF THE INVENTION

1. Field of the Invention

The present invention relates to a technique for controlling display of a user interface screen used for setting print settings of a printer driver which generates print data sent to a printing apparatus.

2. Description of the Related Art

Printer drivers provide user interface used for setting print settings. Some user interface has a preview function. By using the preview function, users can display a preview of the print settings that visualizes the print settings as an abstract image. When a print setting preview window is displayed, a rectangular region that represents paper corresponding to output paper size selected by the print setting is displayed, and the user can confirm the print result before printing the data. At that time, the size or the aspect ratio of an image prepared in advance (original image) is adjusted by the printer driver so that the image matches the rectangular region that represents the selected output paper size.

Conventionally, various methods are used for changing an original image into an image of a different size or with a different aspect ratio. Such methods are, for example, cropping of the original image, enlargement/reduction of the original image, and a combination of cropping and enlargement/reduction of the original image. When the cropping is performed, if the original image is larger than its output region, the portion that protrudes outside of the output region is deleted or made invisible while the scale of the original image is maintained. Among the cropping methods, Japanese Patent Application Laid-Open No. 2004-023544 discusses a method that matches a main component (hereinafter referred to as a main object) of the original image and the center of the output region as much as possible.

When the enlargement/reduction is performed, the original image is enlarged or reduced in the horizontal or the vertical direction so that the image fits in the output region and then output the enlarged or reduced image as it is. Further, when the combination of the cropping and the enlargement/reduction is performed, the original image is enlarged or reduced such that at least one side of the original image matches one side of the output region and another side of the original image matches the corresponding side of the output region or extends off the output region. Then the portion of the original image that extends off the output region is deleted or made invisible (Japanese Patent Application Laid-Open No. 2003-046763).

However, according to the above-described conventional image size adjustment method, legibility of the entire image or the main object may be reduced due to removal of a portion of the main object of the original image, unnecessary reduction of the original image, or excessive modification.

For example, according to the simple cropping, if the output region is smaller than the main object of the original image, even if the center of the main object and the center of the output region overlap one another, a portion of the main object will be removed. Further, according to the combination method of the cropping and the enlargement/reduction, if the longer side of the output region is shorter than the corresponding side of the original image, the original image will always be reduced. Thus, even if the size of the original image is small enough that it fits in the output region, the original image is always reduced. Further, if the original image is separately enlarged or reduced in the horizontal or vertical direction, the original image may be excessively modified depending on the aspect ratio. In other words, either of the above-described methods may produce a removed image portion, an unnecessarily reduced image, or excessive modification.

When the conventional image adjustment method is applied to the print setting preview display of the printer driver, possibility of the following problems may be raised. For example, depending on the selected size of the output paper, a removed portion of the main object, an unnecessarily reduced image, or excessive modification of the original image may appear on the print setting preview display. Then, the user might misinterpret the preview and think that such an image will be printed on the paper.

SUMMARY OF THE INVENTION

The present invention is directed to providing a method useful for displaying an image adjusted to an arbitrary size or aspect ratio without removing a main object of the image, performing useless reduction, performing excessive modification on a printer driver setting preview, or producing an unnecessary margin.

According to an aspect of the present invention, a method of controlling an information processing apparatus configured to control display of a user interface screen used for print setting of a printer driver generating print data to be transmitted to a printing apparatus includes adjusting a predetermined image, after determining an output region corresponding to an output paper size set by the print setting in a display region of the user interface screen, such that a size of the image is adjusted to a size of the output region display area and displaying the image having the size adjusted in the output region of the display area. Adjusting the image includes (i) if a length of at least one side of the output region is longer than a corresponding side of the image, cropping the image after performing enlargement processing of the image such that a removed portion of a distribution region of a main object in the image set in advance is at the minimum after the enlargement, (ii) if a length of each side of the output region is shorter than or equal to a corresponding side of the image and longer than a corresponding side of the distribution region of the main object, cropping the image such that the distribution region of the main object is not cropped without scaling the image, and (iii) if a length of each side of the output region is shorter than or equal to a corresponding side of the image and not longer than a corresponding side of the distribution region of the main object, cropping the image after performing reduction processing of the image such that a removed portion of the distribution region of the main object is at the minimum after the reduction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flowchart illustrating an example of image size adjustment processing performed before a print setting preview is displayed on the printer driver UI executed by the UI driver.

DESCRIPTION OF THE EMBODIMENTS

Various exemplary embodiments, features, and aspects of the invention will be described in detail below with reference to the drawings.

The embodiments described below shall not be construed as limiting the scope of claims of the present invention, and not all of the combinations of the features described in the embodiments are necessary in solving the issues of the present invention.

A first exemplary embodiment will now be described. In the first exemplary embodiment, the present invention is applied to a print control program that runs on a personal computer and a user interface mainly of a printer driver.

Figure 1:
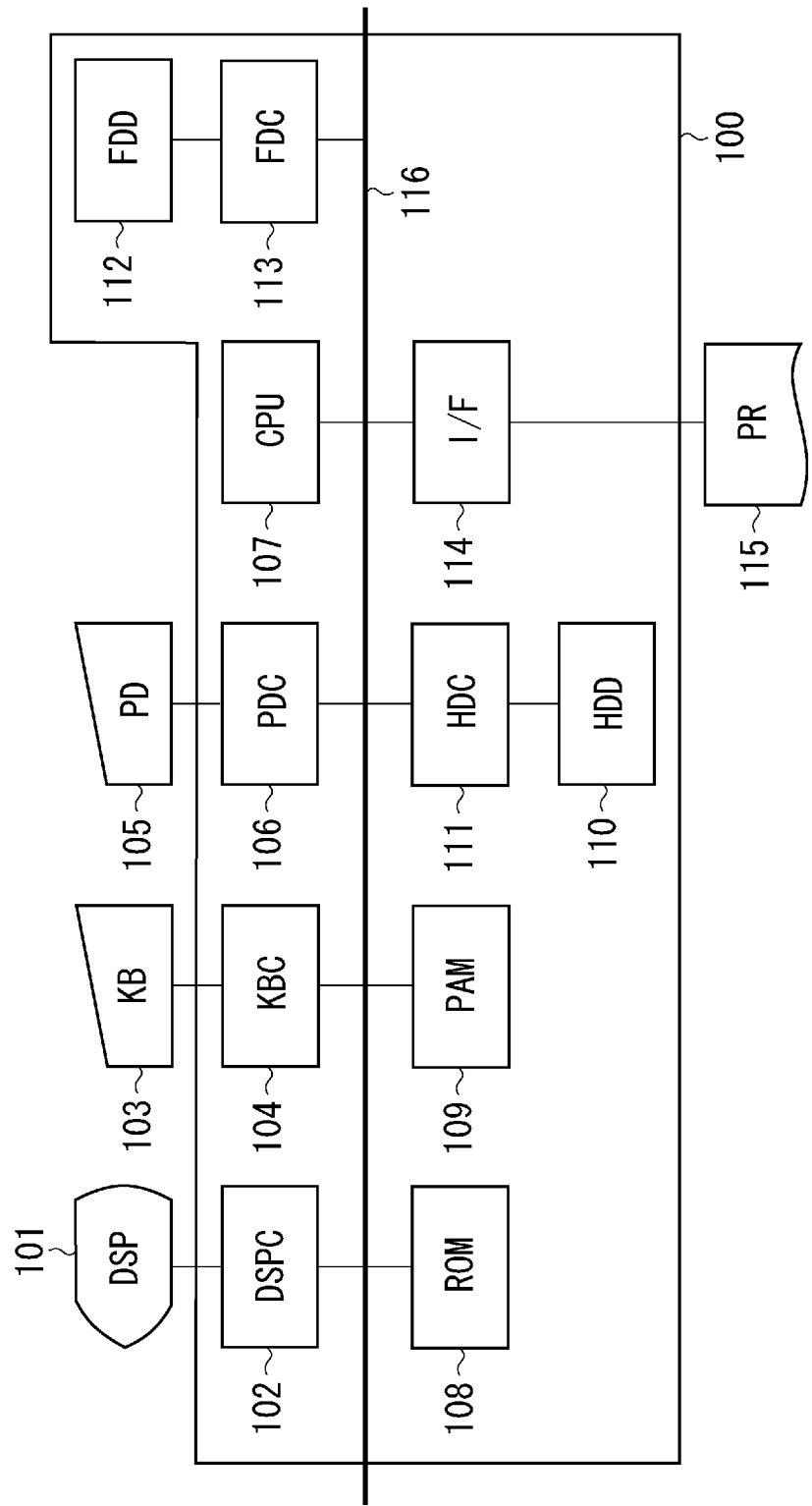
FIG. 1 is a block diagram illustrating a configuration of a printing system including a print control apparatus according to an exemplary embodiment of the present invention.

FIG. 1 is a block diagram illustrating a configuration of a printing system including an information processing apparatus according to an exemplary embodiment of the present invention.

In FIG. 1, a host computer apparatus 100 is connected to a display device such as a display (DSP) 101. The DSP 101 displays a print setting dialog provided by a printer driver and printer status information. The DSP 101 is controlled by a DSP controller (DSPC) 102.

A keyboard (KB) 103 is a data input apparatus. The KB 103 is controlled by a keyboard controller (KBC) 104. A pointing device (PD) 105 is a coordinate input device. The PD 105 is controlled by a pointing device controller (PDC) 106.

A CPU 107 controls the entire host computer apparatus. A ROM 108 stores programs including a boot program. A RAM 109 is a memory into which an operation system (OS), an application program, and a printer driver program are loaded. It also functions as a work area of the CPU 107.

A hard disk apparatus (HDD) 110 stores the OS, the application program, the printer driver program, and font data. Further the HDD 110 temporarily stores, for example, a spool file. The HDD 110 is controlled by a hard disk controller (HDC) 111.

A flexible disk device (FDD) 112 is a drive device of a portable storage medium. The FDD 112 is controlled by a flexible disk controller (FDC) 113. An interface (I/F) 114 connects the host computer 100 and a printer 115 such as an ink jet printer, a sublimatic printer, or a laser beam printer via an interface cable. A bus 116 is used for connecting each device.

When a user turns on the power of the host computer apparatus 100, the CPU 107 is started according to a boot program stored in the ROM 108. Then, the CPU 107 loads the OS from the HDD 110 and the state of the host computer apparatus 100 is changed into a user operation wait state. The user can make various operations using the KB 103 or the PD 105 and the application. For example, the user can give a print instruction or a print setting change order for the printer driver. If the CPU 107 receives a print instruction or a print setting change order for the printer driver, the CPU 107 loads a printer driver program stored in the HDD 110 into the RAM 109 and executes it. Further, if the printer driver program is set such that it can be automatically started, the CPU 107 executes the printer driver program.

Figure 2:
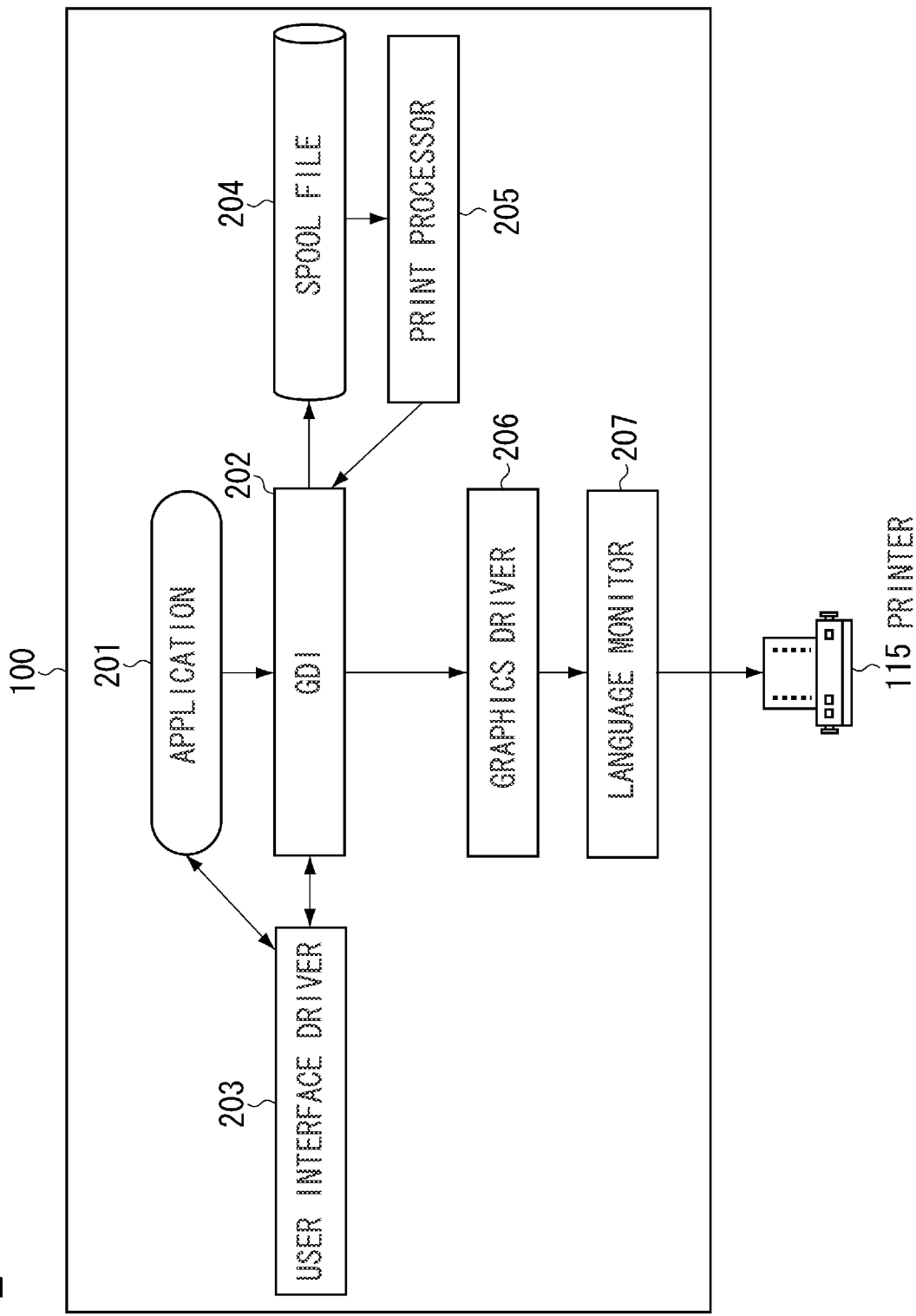
FIG. 2 is a block diagram illustrating a configuration of software of the printing system illustrated in FIG. 1. The software is mainly a printer driver.

FIG. 2 is a block diagram illustrating a configuration of software (mainly the printer driver) of the printing system illustrated in FIG. 1. In FIG. 2, components same as those in FIG. 1 are denoted by the same reference numerals.

In FIG. 2, an application program (hereinafter referred to as an application) 201 is used when the user generates a document using the KB 103 or the PD 105. Further, when the application 201 detects that a print instruction has been given by the user, the application 201 inquires a user interface driver (UI driver) 203 of a function of the printer system in order to print the above-described document. After then, the application 201 notifies the printing system including a graphic device interface (GDI) 202 of the OS that the printing will be started.

When the GDI 202 receives the notification from the application 201 that the printing will be started, the GDI 202 notifies the UI driver 203 of a print event in which the printing will be started according to the application 201. Next, the application 201 supplies print data of the document to be printed to the GDI 202 and continues the print processing. The print data that has been supplied to the GDI 202 is stored in a spool file 204.

A print processor 205 reads out the print data from the spool file 204. The print data read out by the print processor 205 is transmitted to a language monitor 207 via a graphics driver 206.

The language monitor 207 transmits the print data to the printer 115 while making bidirectional communication with the printer 115. The language monitor 207 receives state information about the printer 115 as required. Further, the language monitor 207 transmits the current printer state or printing state to a status monitor (not shown) based on information obtained from the printer 115 or the print data to be transmitted. Then, the status monitor displays the state. The status monitor not only displays the printer state and the printing state. For example, if printing is suspended for some reason, the user is presented with a variety of choices. When the user enters a response, it is transmitted to the language monitor 207.

The UI driver 203 displays a print setting screen of the printer driver as a user interface (printer driver UI) illustrated in FIG. 3 described below on the display 101 and accepts a print setting set by the user using the KB 103 or the PD 105. In other words, the UI driver 203 controls display of user interface screen used for the print setting of the printer driver that generates print data to be transmitted to the printer 115, and input of the print setting.

The components of reference numerals 201 to 203 and 205 to 207 in FIG. 2 are program modules. Before the printing is started or the print setting is changed, a necessary program is loaded by the CPU 107 from the HDD 110 into the RAM 109 and executed. The spool file 204 is generally generated in the HDD 110.

Next, the printer driver UI will be described with reference to FIGS. 3A and 3B. The display of the printer driver UI is controlled by the UI driver 203.

Figure 3A:
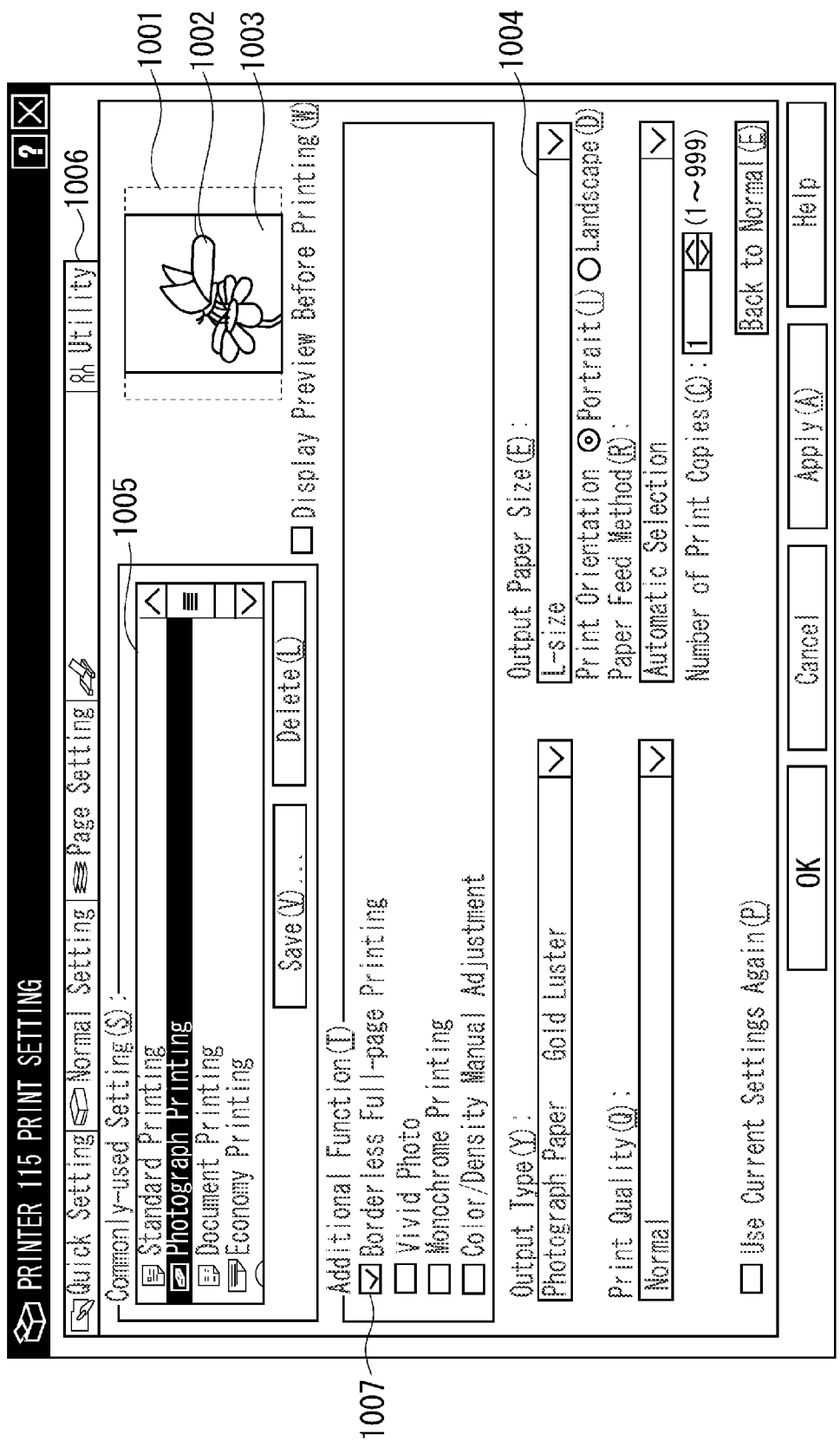
FIGS. 3A and 3B illustrate examples of a printer driver UI (print setting screen) displayed on a display by a UI driver.
Figure 3B:
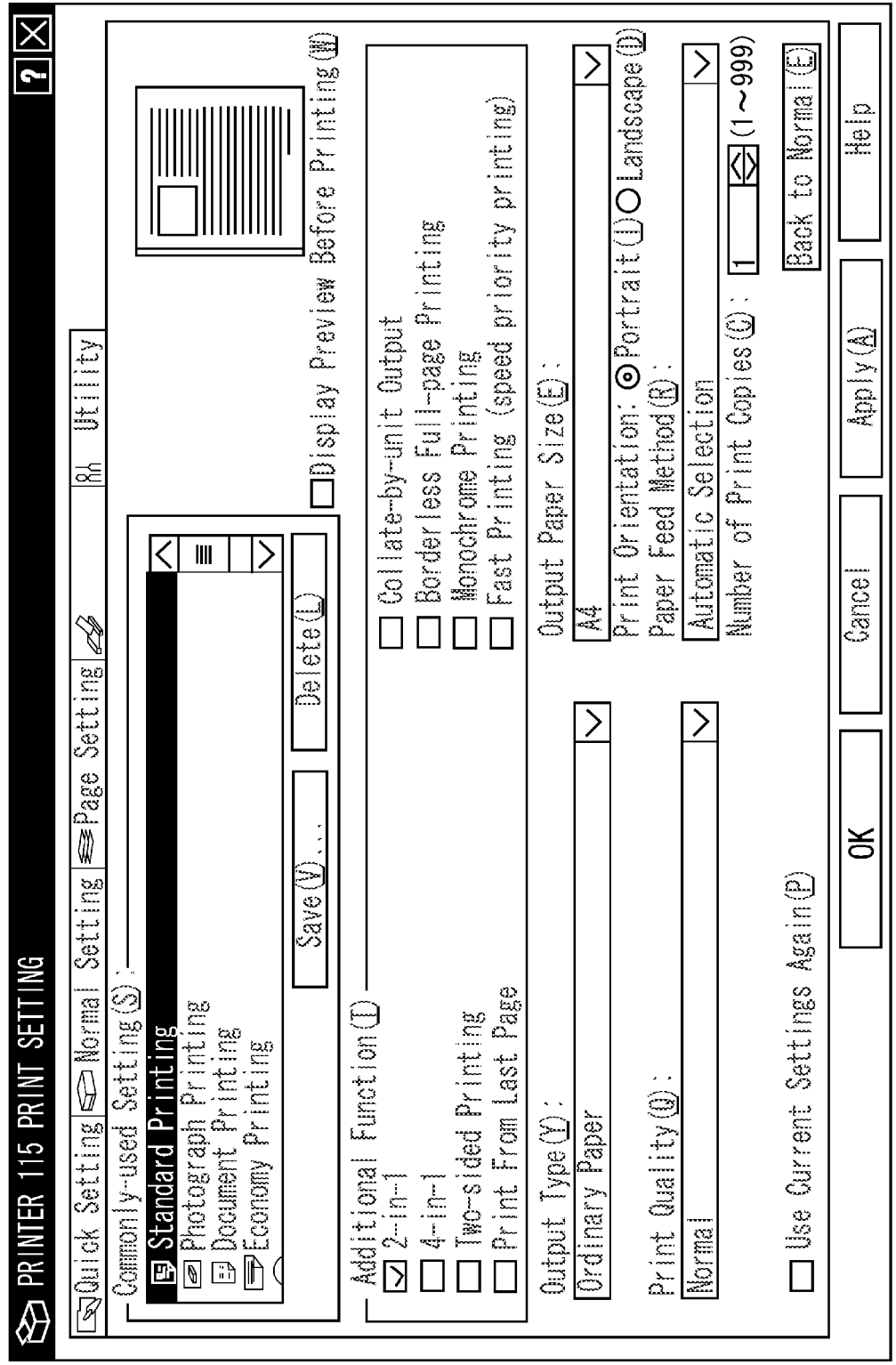

FIGS. 3A and 3B illustrate examples of a printer driver UI (print setting screen) displayed on the display 101 by the UI driver 203. As illustrated in FIG. 3A, a display area 1001 displays a print setting preview (layout confirmation view) of the printer driver UI. When the user sets the print setting, the user refers to the display area 1001.

The UI driver 203 displays a rectangular region 1002 in the display area 1001 as the print setting preview. The rectangular region 1002, which represents output paper, has an aspect ratio corresponding to output paper size 1004. The UI driver 203 displays an image 1003, which is abstract print data, in the rectangular region. For example, if "L size" is set in the output paper size 1004, the rectangular region 1002 having an aspect ratio that corresponds to L size paper is displayed in the display area 1001, and the image 1003 is displayed in the rectangular region 1002. In other words, the rectangular region 1002 having an aspect ratio of the paper is set in the display area and the rectangular region 1002 is displayed as the output region.

If photographic printing is selected by the printer driver UI (e.g., "photographic printing" in commonly-used setting 1005 is selected), the UI driver 203 displays an abstract image of photographic print data as shown by the image 1003 illustrated in FIG. 3A.

Further, if a setting other than the photographic printing is set by the printer driver UI (e.g., "standard printing" in the commonly-used setting 1005 is selected), the UI driver 203 displays, as illustrated in FIG. 3B, an abstract image of document print data as the image 1003 with abstract print data. According to the displayed print setting preview, the user can make the print settings while visually confirming the print result.

As illustrated in FIG. 3A, if an abstract image of photographic print data is displayed in the rectangular region 1002 in the display area 1001 as a print setting preview, the UI driver 203 executes the processing in the flowchart illustrated in FIG. 4 described below. According to this processing, the UI driver 203 performs processing such as enlargement, reduction, or cropping of the original image as needed such that the size of the original image of the print setting preview (image with abstract photographic print data) is optimum with respect to the output region (rectangle representing the output paper).

Next, the image size adjustment processing for print setting preview display in the printer driver UI executed by the UI driver 203 will be described with reference to FIGS. 4 to 6. As described above, when the print setting preview is displayed, an abstract image of the print data is displayed in a rectangular region that represents the output paper. Thus, by using the print setting preview, the user can confirm the print result prior to the printing.

FIG. 4 is a flowchart illustrating an example of the image size adjustment processing performed before the print setting preview is displayed on the printer driver UI. The processing is executed by the UI driver 203.

The processing of the flowchart is started when the UI driver 203 displays the print setting preview in the display area 1001 of the printer driver UI. Before step S301, the UI driver 203 acquires the size of the display area 1001, the aspect ratio of the output paper size, the size of the abstract image of the print data (hereinafter referred to as original image), and information of the position and the size of the main object distribution region of the original image. Additionally, the UI driver 203 calculates the size of the rectangular region 1002 (a rectangle representing output paper in the print setting preview (hereinafter referred to as output region)) based on the size of the display area 1001 and the aspect ratio of the output paper.

The aspect ratio of the rectangle representing the output paper is determined according to the output paper size selected by the output paper size 1004. Further, the original image is stored in advance in a printer driver program. Further, the main object distribution region of the original image is a rectangular region where an element that gives the impression of the original image or the main object exists. The main object distribution region is also stored in advance in the printer driver program.

In step S301, the UI driver 203 determines whether the length of at least one side of the output region is longer than the corresponding side of the original image. If the length of at least one side of the output region is determined to be longer than the corresponding side of the original image (YES in step S301), the processing proceeds to step S302.

In step S302, the UI driver 203 enlarges the original image so that the image circumscribes the rectangle of the output region.

In step S303, when the image after the enlargement (enlarged image) is displayed, the UI driver 203 crops the portion that extends beyond the sides of the rectangle of the output region, which is also called the protruding portion. At that time, the UI driver 203 crops the protruding portion when displaying the enlarged image so that the removed amount (removed portion) of the main object distribution region in the enlarged image due to the cropping is at the minimum. In other words, the enlarged image is cropped so that the removed portion of the main object distribution region is at the minimum. Then, the UI driver 203 performs such control that the image after the cropping is displayed in the rectangular region 1002 in the display area 1001 of the printer driver UI.

On the other hand, in step S301, if the lengths of two adjacent sides of the output region are determined to be shorter than or equal to the corresponding sides of the original image (NO in step S301), the processing proceeds to step S304.

In step S304, the UI driver 203 determines whether each side of the output region is longer than or equal to each side of the main object distribution region of the original image. If each side of the output region is determined to be longer than or equal to each side of the main object distribution region (YES in step S304), the processing proceeds to step S305.

In step S305, the UI driver 203 crops the portion that extends beyond the sides of the rectangle of the output region (protruding portion) without performing enlargement/reduction of the original image (without scaling the original image) when the original image is displayed. Before cropping the protruding portion, the UI driver 203 arranges the original image so that the main object distribution region of the original image is not removed when the cropping is performed. In other words, the UI driver 203 crops the image in such a manner that the main object distribution region is not removed. Then, the UI driver 203 makes control such that the image after the cropping is displayed in the rectangular region 1002 in the display area 1001 of the printer driver UI.

On the other hand, in step S304, if at least one side of the output region is determined to be shorter than the corresponding side of the main object distribution region of the original image (NO in step S304), the processing proceeds to step S306.

In step S306, the UI driver 203 determines whether, if the original image is reduced such that the main object distribution region of the original image is inscribed in the output region, each side of the image after the reduction (reduced image) is longer than or equal to each side of the output region. If each side of the reduced image is determined to be longer than or equal to each side of the output region (YES in step S306), the processing proceeds to step S307.

In step S307, the UI driver 203 performs reduction processing of the original image so that the main object distribution region is inscribed in the output region.

Next, in step S308, the UI driver 203 crops the portion that extends beyond the sides of the rectangle of the output region, which is also called the protruding portion, when the image after the reduction (reduced image) is displayed. At that time, the UI driver 203 crops the protruding portion after arranging the reduced image so that the main object distribution region in the reduced image is inscribed in the output region. In other words, the reduced image is cropped so that the removed portion of the main object distribution region is at the minimum. Then, the UI driver 203 performs such control that the image after the cropping is displayed in the rectangular region 1002 in the display area 1001 of the printer driver UI.

On the other hand, in step S306, when the original image is reduced so that the main object distribution region of the original image is inscribed in the output region, if one side of the image after the reduction is shorter than the corresponding side of the output region (NO in step S306), the processing proceeds to step S309.

In step S309, the UI driver 203 performs the reduction processing of the original image so that the original image circumscribes the output region.

In step S310, the UI driver 203 crops the portion that extends beyond the sides of the rectangle of the output region, which is also called the protruding portion, when the image after the reduction (reduced image) is displayed. At that time, the UI driver 203 crops the protruding portion after arranging the reduced image in such a manner that the removed portion of the main object distribution region in the reduced image is at the minimum. In other words, the reduced image is cropped so that the removed portion of the main object distribution region is at the minimum. Then, the UI driver 203 performs such control that the image after the cropping is displayed in the rectangular region 1002 in the display area 1001 of the printer driver UI.

Next, the image size adjustment processing illustrated in FIG. 4 will be described in detail using concrete examples.

In the description below, the display area 1001 of the printer driver UI controlled by the UI driver 203 is 100×100 pixels. Further, the length of the longer side of the rectangular region 1002 is equal to one side of the display area 1001 and the image 1003 is displayed in the rectangular region 1002. In other words, the rectangular region 1002 is displayed such that its longer side is 100 pixels and the image 1003 is displayed in the rectangle.

Figure 5A:
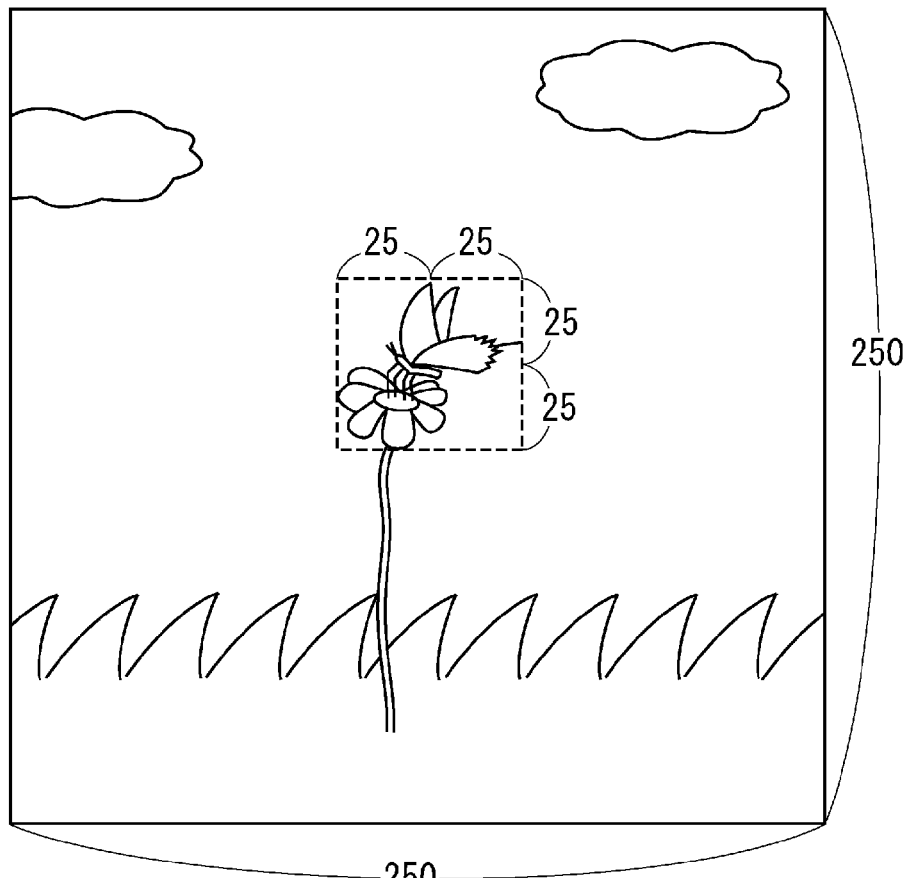
FIGS. 5A, 5B, 5C and 5D illustrate examples of an original image and images that have undergone the image size adjustment processing.
Figure 5B:
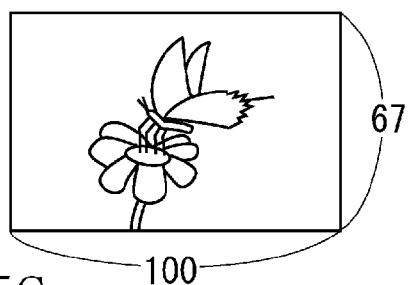

Next, image processing of the image size adjustment processing will be described with reference to FIGS. 5A and 5B. FIG. 5A illustrates an example of the original image. FIG. 5B illustrates an example of the preview display displayed in the output region (an example of an image after the cropping). According to the example illustrated in FIG. 5A, the original image is a 250×250 pixels image. Further, a range of ±25 pixels from the center of the original image (a rectangle of 50×50 pixels) is determined as the main object distribution region.

First, a case where paper having an aspect ratio of 3:2 is set as output paper will be described with reference to FIG. 5B. When paper having an aspect ratio of 3:2 is set as the output paper, since the display area is 100×100 pixels, as illustrated in FIG. 5B, a rectangle of 100×67 pixels is displayed in a schematic form in the display area 1001 as the output paper. Thus, the output region will be a rectangular area of 100×67 pixels.

In this case, since two adjacent sides of the output region (100×67 pixels) are shorter than two adjacent sides of the original image (250×250 pixels), the UI driver 203 determines that the determination in step S301 in FIG. 4 is "NO", and the processing proceeds to step S304 in FIG. 4.

In step S304 in FIG. 4, since two adjacent sides of the output region (100×67 pixels) are longer than two adjacent sides of the main object distribution region (50×50 pixels) of the original image, the UI driver 203 determines that the determination in step S305 is "YES", and the processing proceeds to step S305 in FIG. 4.

In step S305, the UI driver 203 crops the portion that extends beyond the sides of the rectangle of the output region (protruding portion) without performing enlargement/reduction of the original image when the original image is displayed. Before cropping the protruding portion, the UI driver 203 arranges the original image so that the main object distribution region of the original image is not removed when the cropping is performed. The image after cropping is illustrated in FIG. 5B.

Figure 5C:
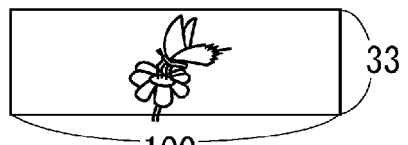

Next, a case where paper having an aspect ratio of 3:1 is used as the output paper will be described with reference to FIG. 5C. When paper having an aspect ratio of 3:1 is set as the output paper, since the display area is 100×100 pixels, as illustrated in FIG. 5C, a rectangle of 100×33 pixels is displayed in a schematic form in the display area 1001 as the output paper. Thus, the output region will be a rectangular area of 100×63 pixels.

In this case, since two adjacent sides of the output region (100×33 pixels) are shorter than two adjacent sides of the original image (250×250 pixels), the UI driver 203 determines that the processing in step S301 in FIG. 4 is "NO", and the processing proceeds to step S304 in FIG. 4. Further, also in step S304 in FIG. 4, since one side of the output region (100×33 pixels) is shorter than a corresponding side of the main object distribution region of the original image (50×50), the UI driver 203 determines that the processing in step S304 in FIG. 4 is "NO", and the processing proceeds to step S306 in FIG. 4.

If the original image is reduced so that the main object distribution region (50×50 pixels) is inscribed in the output region (100×33 pixels), the main object distribution region is reduced by 33/50 times, and the image after the reduction (reduced image) will be a rectangle, which has 165 pixels on a side. Since each side of the reduced image (165×165 pixels) is longer than the corresponding side of the output region (100×33 pixels), the UI driver 203 determines that the processing in step S306 in FIG. 4 is "YES", and the processing proceeds to step S307 in FIG. 4.

In step S307 in FIG. 4, the UI driver 203 reduces the original image (250×250 pixels) by the above-described "33/50" times. Then, the UI driver 203 executes the processing in step S308 in FIG. 4. In step S308 in FIG. 4, the UI driver 203 crops the portion that extends beyond the sides of the rectangle of the output region, which is also called the protruding portion, when the image after the reduction (reduced image) is displayed. At that time, the UI driver 203 crops the protruding portion after arranging the reduced image so that the main object distribution region in the reduced image is inscribed in the output region. The image after the cropping is illustrated in FIG. 5C.

Next, a case where paper having an aspect ratio of 10:1 is set as the output paper will be described with reference to FIG. 5D.

Figure 5D:
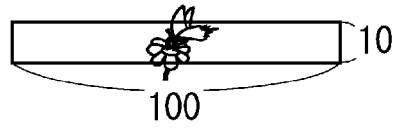

If paper having an aspect ratio of 10:1 is set as the output paper, since the display area is 100×100 pixels, as illustrated in FIG. 5D, a rectangle of 100×10 pixels is displayed in a schematic form in the display area 1001 as the output paper. Thus, the output region will be a rectangular area of 100×10 pixels.

In this case, since two adjacent sides of the output region (100×10 pixels) are shorter than two adjacent sides of the original image (250×250 pixels), the UI driver 203 determines that the determination in step S301 in FIG. 4 is "NO", and the processing proceeds to step S304 in FIG. 4. Further, in step S304 in FIG. 4, since one side of the output region (100×10 pixels) is shorter than the corresponding side of the main object distribution region of the original image (50×50 pixels), the UI driver 203 determines in step S304 that the processing in FIG. 4 is "NO", and the processing proceeds to step S306 in FIG. 4.

Further, if the original image is reduced so that the main object distribution region (50×50 pixels) is inscribed in the output region (100×10 pixels), the main object distribution region is reduced by 10/50 times, and the image after the reduction (reduced image) will be a rectangle, which has 50 pixels on a side. Since one side of the reduced image (50×50 pixels) is shorter than the corresponding side of the output region (100×10 pixels), the UI driver 203 determines that the processing in step S306 in FIG. 4 is "NO", and the processing proceeds to step S309 in FIG. 4.

In step S309 in FIG. 4, the UI driver 203 reduces the original image so that the original image (250×250 pixels) circumscribes the output region (100×10 pixels). In other words, the image is reduced by "100/250" times.

In step S310 in FIG. 4, when the image after the reduction (reduced image) is displayed, the UI driver 203 crops the portion that extends beyond the sides of the rectangle of the output region, which is also called the protruding portion. At that time, the UI driver 203 crops the protruding portion after arranging the main object distribution region in the reduced image so that the cropped portion is at the minimum. The image after the cropping is illustrated in FIG. 5D.

The printer driver UI according to the present embodiment can be enlarged/reduced by the user operating the PD 105. By enlarging/reducing the printer driver UI, the display area 1001 can also be enlarged/reduced.

In the following description, the display area is enlarged into a 300×300 pixel area by enlarging the printer driver UI. In other words, in the example below, the rectangular region 1002 is arranged such that the length of the longer side is 300 pixels, and the image 1003 is displayed in the rectangle.

Figure 6:
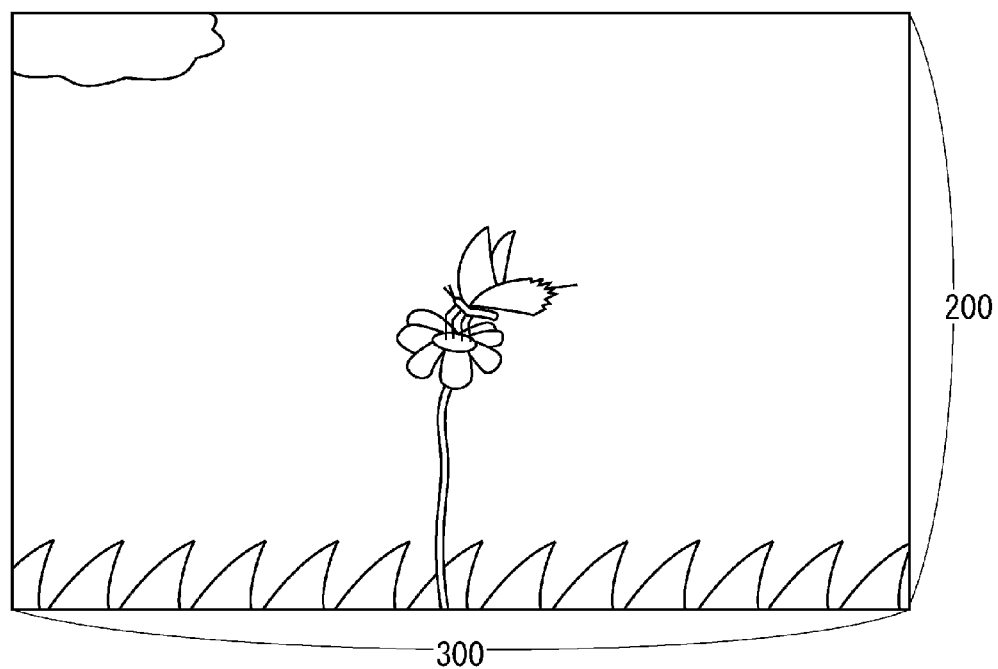
FIG. 6 illustrates an example of an image that has undergone the image size adjustment processing.

FIG. 6 illustrates an example of the preview display displayed in the output region (example of an image after cropping).

Now, a case where paper having an aspect ratio of 3:2 is used as the output paper will be described with reference to FIG. 6. When paper having an aspect ratio of 3:2 is set as the output paper, since the display area is 300×300 pixels, as illustrated in FIG. 6, a rectangle of 300×200 pixels is displayed in a schematic form in the display area 1001 as the output paper. Thus, the output region will be a rectangular area of 300×200 pixels.

According to this example, since one side of the output region (300×200 pixels) is longer than the corresponding side of the original image (250×250 pixels), in step S301 in FIG. 4, the UI driver 203 determines that the determination is "YES" and executes the processing in step S302 in FIG. 4.

In step S302 in FIG. 4, the UI driver 203 enlarges the original image (250×250 pixels) so that it circumscribes the output region (300×200 pixels). In other words, the UI driver 203 enlarges the original image by "300/250" times.

Further, in step S303 in FIG. 4, the UI driver 203 crops the portion that extends beyond the sides of the rectangle of the output region, which is also called the protruding portion, when the image after the enlargement (enlarged image) is displayed. At that time, the enlarged image is arranged in such a manner that the main object distribution region in the enlarged image is not cropped. Then the UI driver 203 performs the cropping of the protruding portion. The image after the cropping is illustrated in FIG. 6.

As described above, even if both adjacent sides of the output region are shorter than the corresponding sides of the original image, if the distribution region of the main object that determines the impression of the original image satisfactorily fits in the output region, the original image is not reduced and only the cropping will be performed when the image is displayed. In this way, the size of the image displayed as the print setting preview can be adjusted without having the legibility of the original image reduced. In other words, an image which is adjusted to the size of the output paper that has been set can be displayed as the printer driver setting preview without removing the main object, unnecessarily reducing the image, and performing excessive modification as well as without leaving an unnecessary margin. Thus, removal of a part of the main object, unnecessary reduction, and excessive modification can be prevented when the printing preview is displayed regardless of the output paper size. Thus, misunderstanding of the user can be prevented.

Further, if a portion of the main object distribution region is removed when the above-described cropping is performed, the original image is reduced such that the main object distribution region does not exceed the output region. In this manner, image reduction that may reduce legibility of the original image can be minimized.

Further, if a margin is left in the output region when the image is reduced based on the main object distribution region, by reducing the original image such that it circumscribes the output region, an image without the margin can be obtained. Thus, the user can easily set the print setting using the schematic image by confirming the print result before performing the printing operation.

According to the first exemplary embodiment, a certain image (predetermined image) is determined as an original image and information used for determining the position and the size of the main object distribution region of the original image is stored in advance in the output program. According to a second exemplary embodiment of the present invention, the user can set an arbitrary image as an original image and also set the information used for determining the position and the size of the main object distribution region of the original image. The second exemplary embodiment will be described with reference to FIG. 7.

According to the present embodiment, the user can designate the original image according to where the image file is stored using the UI driver 203. For example, when the user selects the "utility" tab 1006 of the printer driver UI illustrated in FIG. 3 by using the PD 105, a utility page (not shown) is displayed on the printer driver UI. Then, according to the instruction that appears on the utility page, the user designates the original image according to where the image file is stored. By such an operation, the original image can be designated.

Figure 7:
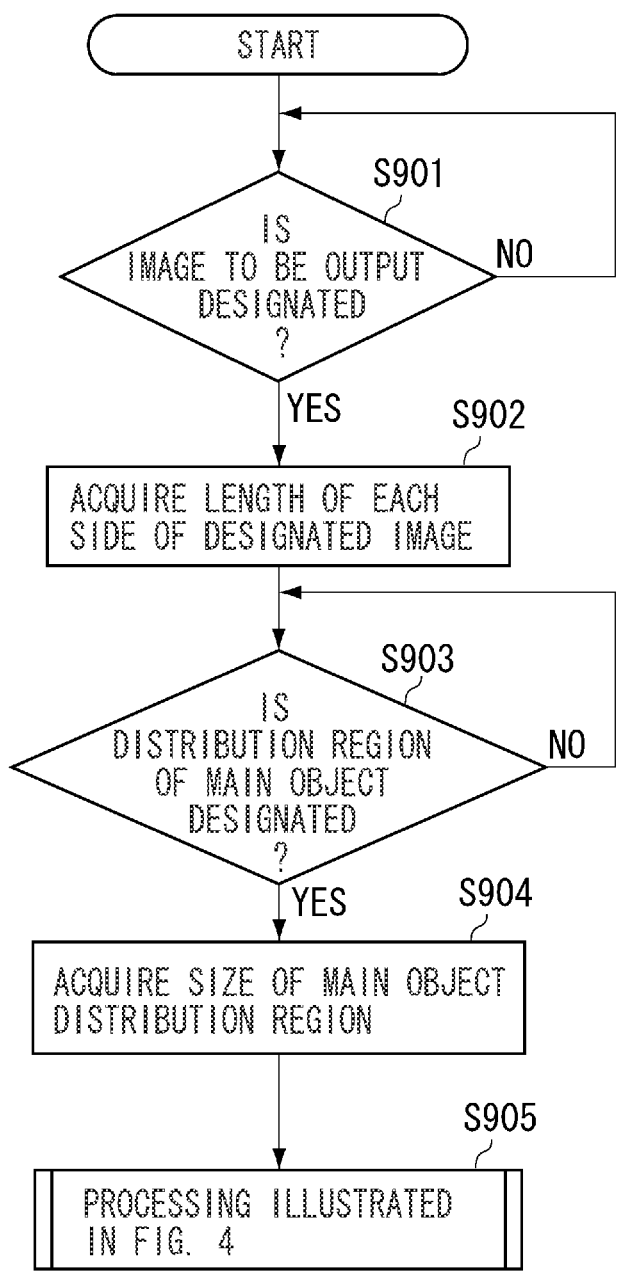
FIG. 7 is a flowchart illustrating an example of original image setting processing executed by the UI driver.

FIG. 7 is a flowchart illustrating an example of original image setting processing executed by the UI driver 203.

In step S901, the UI driver 203 detects whether the user has designated an image to be set as an original image. If the UI driver 203 detects that such an image has been designated ("YES" in step S901), the processing proceeds to step S902. If the UI driver 203 detects that such an image has not been designated ("NO" in step S901), the processing returns to step S901. In step S902, the UI driver 203 acquires the length of each side of the designated image. In step S903, the UI driver 203 waits until the main object distribution region in the image designated in step S901 is designated. The main object distribution region can be designated if the user inputs coordinate values using the KB 103. Further, if the UI driver 203 displays the designated original image on the display 101, the user can designate the main object distribution region by moving a cursor of the PD 105 on the display and designating a rectangle.

If the UI driver 203 detects that the main object distribution region has been designated by the user ("YES" in step S903), the processing proceeds to step S904. If not ("NO" in step S903), step S903 is repeated.

In step S904, the UI driver 203 acquires the position and the size of the main object distribution region instructed in step S903 described above. Then, the UI driver 203 stores information of the image designated in steps S901 and S902 in the printer driver program as information of the original image. The information may also be stored in the HDD 110. Further, the UI driver 203 stores the information of the main object distribution region designated in the above-described steps S903 and S904 in the printer driver program as information of the main object distribution region of the original image. The information may also be stored in the HDD 110. In step S905, the UI driver 203 executes the image size adjustment processing illustrated in FIG. 4.

As described above, according to the present embodiment, the image size adjustment processing illustrated in FIG. 4 can be applied to an arbitrary original image, and the size of the image displayed as the print setting preview can be adjusted without reducing image legibility and without a margin. Thus, the user can easily perform the print setting by confirming the print result in advance using the image designated by the user and displayed on the screen.

According to the second exemplary embodiment, the user designates the main object distribution region of the original image. However, the main object distribution region can also be automatically detected using image recognition of the original image. For example, first, the main object is detected according to a common image recognition method. The main object is detected, for example, using luminance histogram of a high frequency portion, or if the main object is a human figure, distribution of a certain identification color such as skin color. Then, a rectangle that circumscribes the detected main object is set as a distribution region of the main object, and the image size adjustment processing illustrated in FIG. 4 is executed.

According to a third exemplary embodiment of the present invention, the image size adjustment processing illustrated in FIG. 4 can be applied to an arbitrary original image and the size of an image displayed as the print setting preview can be automatically adjusted without reducing the legibility of the image and without a margin.

According to the first to the third exemplary embodiments described above, the image 1003 is output so that it is displayed in the rectangular region 1002 (a rectangle region that represents paper) on the printer driver UI as the output region. According to a fourth exemplary embodiment of the present invention, the image 1003 is displayed in a rectangle that represents a printable region in the rectangular region 1002 as an output region considering printing of print data on paper. The fourth exemplary embodiment will now be described.

For example, if "borderless full-page printing" 1007 illustrated in FIG. 3A is not selected, the UI driver 203 determines that the rectangle that represents the printable region in the rectangular region 1002 is the output region and outputs the image 1003. On the other hand, if the "borderless full-page printing" 1007 illustrated in FIG. 3A is selected, as described in the first to the third exemplary embodiments, the UI driver 203 determines that the output region is the rectangular region 1002 and then outputs the image 1003.

According to the present embodiment, the image size of the original image can be adjusted according to the output regions of various print settings without reducing the legibility of the image and without a margin. Thus, the user can easily perform the print setting while confirming the result of the printing performed on a printable region on paper in advance using the user designated image displayed on the print setting screen.

According to the first to the fourth exemplary embodiments described above, the image size adjustment processing illustrated in FIG. 4 is performed with respect to the display device (especially, the rectangular region on the printer driver UI) as the output region. According to a fifth exemplary embodiment of the present invention, the image size adjustment processing illustrated in FIG. 4 is performed, considering a case where the image is printed on paper with a different aspect ratio, by setting a memory region into which the image data is loaded when the data is actually printed on paper as the output region. The fifth exemplary embodiment of the present invention will now be described.

For example, the image size adjustment processing in FIG. 4 can be applied to application software having a function to adjust image size. Thus, for example, an original image captured by a digital camera can be printed with its size adjusted but without reducing the legibility and without a margin.

Further, an arbitrary memory region can be used as the output region when the image size adjustment processing illustrated in FIG. 4 is performed. In this way, for example, a size of an original image captured by a digital camera can be adjusted without reducing legibility and, further, without a margin.

Next, a sixth exemplary embodiment will be described. According to the first to the fifth exemplary embodiments described above, the output region is a rectangle. However, the shape of the output region is not limited to a rectangle and, for example, it maybe a polygon, a circle, or even a shape of a doughnut.

Other Embodiments

The present invention can also be realized by executing the following process. That is, a process in which a software (computer-executable process) that realizes the functions of the above-described embodiments is supplied to the system or apparatus via a network or a recording medium of various types, and then a computer of the system or apparatus (or devices such as CPU or MPU) reads out the program and executes it. In such a case, the recording medium where the program is stored as well as the program are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-280720 filed Dec. 10, 2009, which is hereby incorporated by reference herein in its entirety.

What is claimed is:

1. A method of controlling an information processing apparatus configured to control display of a user interface screen of a print control program used for print setting of print data to be transmitted to a printing apparatus, the method comprising:

adjusting a predetermined image, after determining an output region corresponding to an output paper size set by the print setting in a display area of the user interface screen, such that a size of the predetermined image is adjusted to a size of the output region; and displaying the image having the size adjusted in the output region of the display area, wherein adjusting the predetermined image includes, if a length of each side of the output region is shorter than or equal to a corresponding side of the predetermined image and not longer than a corresponding side of a distribution region of a main object in the predetermined image set in advance, performing reduction processing of the predetermined image and cropping the reduced image such that a removed portion of the distribution region of the main object is at a minimum, and wherein, according to the reduction processing, in a case where the predetermined image is reduced such that the distribution region of the main object is inscribed in the output region, if a length of each side of the reduced image is longer than or equal to a corresponding side of the output region, the predetermined image is reduced such that the distribution region of the main object is inscribed in the output region, and in a case where the predetermined image is reduced such that the distribution region of the main object is inscribed in the output region, if a length of at least one side of the reduced image is shorter than a corresponding side of the output region, the predetermined image is reduced such that the predetermined image circumscribes the output region.

2. The method of controlling the information processing apparatus according to claim 1, wherein adjusting the predetermined image further includes, if a length of at least one side of the output region is longer than a corresponding side of the predetermined image, performing enlargement processing of the predetermined image and cropping the enlarged image such that a removed portion of a distribution region of a main object in the predetermined image set in advance is at the minimum; and wherein the enlargement processing is to enlarge the predetermined image such that the predetermined image is enlarged into a size that circumscribes the output region.

3. The method of controlling the information processing apparatus according to claim 1, wherein the output region is a rectangular region that represents paper corresponding to an output paper size set by the print setting.

4. The method of controlling the information processing apparatus according to claim 1, wherein the output region is a rectangular region that represents a printable region of paper corresponding to an output paper size set by the print setting paper.

5. The method of controlling the information processing apparatus according to claim 1, wherein adjusting the predetermined image further includes, if a length of each side of the output region is shorter than or equal to a corresponding side of the predetermined image and longer than a corresponding side of the distribution region of the main object, cropping the predetermined image such that the distribution region of the main object is not cropped without scaling the predetermined image.

6. An information processing apparatus configured to control display of a user interface screen of a print control program used for print setting of print data to be transmitted to a printing apparatus, the apparatus comprising:

an adjustment unit configured to adjust a predetermined image after determining an output region corresponding to an output paper size set by the print setting in a display area of the user interface screen such that a size of the predetermined image is adjusted to a size of the output region; and a display unit configured to display the image having the size adjusted by the adjustment unit in the output region of the display area, wherein the adjustment unit performs, if a length of each side of the output region is shorter than or equal to a corresponding side of the predetermined image and not longer than a corresponding side of a distribution region of a main object in the predetermined image set in advance, reduction processing of the predetermined image and cropping the reduced image such that a removed portion of the distribution region of the main object is at a minimum, and wherein, according to the reduction processing, in a case where the predetermined image is reduced such that the distribution region of the main object is inscribed in the output region, if a length of each side of the reduced image is longer than or equal to a corresponding side of the output region, the predetermined image is reduced such that the distribution region of the main object is inscribed in the output region, and in a case where the predetermined image is reduced such that the distribution region of the main object is inscribed in the output region, if a length of at least one side of the reduced image is shorter than a corresponding side of the output region, the predetermined image is reduced such that the predetermined image circumscribes the output region.

7. A non-transitory computer-readable storage medium on which is stored a computer-executable process for making a computer execute a method for controlling display of a user interface screen of a print control program used for print setting of print data to be transmitted to a printing apparatus, the method comprising:

adjusting a predetermined image, after determining an output region corresponding to an output paper size set by the print setting in a display area of the user interface screen, such that a size of the predetermined image is adjusted to a size of the output region; and displaying the image having the size adjusted in the output region of the display area, wherein adjusting the predetermined image includes, if a length of each side of the output region is shorter than or equal to a corresponding side of the predetermined image and not longer than a corresponding side of a distribution region of a main object in the predetermined image set in advance, performing reduction processing of the predetermined image and cropping the reduced image such that a removed portion of the distribution region of the main object is at a minimum, and wherein, according to the reduction processing, in a case where the predetermined image is reduced such that the distribution region of the main object is inscribed in the output region, if a length of each side of the reduced image is longer than or equal to a corresponding side of the output region, the predetermined image is reduced such that the distribution region of the main object is inscribed in the output region, and in a case where the predetermined image is reduced such that the distribution region of the main object is inscribed in the output region, if a length of at least one side of the reduced image is shorter than a corresponding side of the output region, the predetermined image is reduced such that the predetermined image circumscribes the output region.

* * * * *